United States Patent Office 3,066,115
Patented Nov. 27, 1962

3,066,115
PROCESS FOR THE POLYMERIZATION OF ETHYLENICALLY UNSATURATED MONOMERS WITH A DIPHENYL ETHANE ACCELERATOR
Robert Roy Smith, East Bergholt, Dennis Charles Macmillan Mann, Mistley, and Gordon Robertson Logie, Brantham, near Manningtree, England, assignors to B.X. Plastics Limited, Essex, England, a British company
No Drawing. Filed Nov. 28, 1958, Ser. No. 776,687
Claims priority, application Great Britain Dec. 4, 1957
10 Claims. (Cl. 260—45.5)

This invention relates to the polymerisation of unsaturated compounds of the type containing an ethylenic linkage which are polymerized by means of free radicals and which can be subjected to a temperature of 150 to 250° C. during the polymerisation. Such compounds are referred to hereinafter in the interests of brevity as "compounds of the above kind."

As examples of such unsaturated compounds there may be mentioned especially styrene, styrene derivatives, for example, the vinyl toluenes, and also mixtures of styrene or its derivatives with other co-polymerisable substances, for instance, maleic anhydride, acenaphthylene and acrylonitrile; and also allyl monomers.

It is known that compounds of the above kind or mixtures thereof, usually polymerize or co-polymerize in mass by the application of heat alone, without addition of any "catalyst" or polymerisation accelerator, and that the quality of the polymeric products prepared in this manner was often the best obtainable, especially in respect of colour or clarity. The final stage of these purely thermal polymerizations, however, is generally very slow and this is a serious disadvantage in commercial production. For instance, pure styrene can be polymerized in mass to an exceptionally clear, water-white easily-moulded product by heating the monomer alone for varying periods of time at temperatures of about 60° C. and above; but the time taken for the last stage of reaction to reduce the content of residual monomer from about 5 to 0.5% is as long as about one day even when the temperature is raised to 200° C. during this stage. High contents of monomer are generally undesirable in the final product, and taking this into account the disadvantage of slow final conversion has usually either been accepted or recourse has been made to a distinct processing step such as vacuum-stripping of residual monomer before reaching the very slow final stage and thereby obviating the latter.

It is one object of the present invention to provide in a mass process for the polymerisation of compounds of the above kind, a means of accelerating the final, normally slow stage of polymerisation at temperatures within the range of about 150 to 250° C., thereby affording an attractive alternative procedure without resort to removal of residual monomer.

The present invention provides a process for the polymerisation in mass of unsaturated compounds containing ethylenic linkages selected from the group consisting of styrene, ortho-, meta- and para-vinyl toluenes and allyl monomers, which comprises polymerising the said unsaturated compound in a first stage by heating to a temperature of at most 125° C. until the polymerisable compound has been converted to an extent of at least 30%, any polymerisation initiator used in this stage being one that dissociates to give free radicals, and thereafter heating the compound in a final stage to a temperature within the range of 150 to 250° C. while catalytically accelerating the rate of polymerisation to a significant extent by the incorporation of at least 0.001% by weight of a diphenyl-ethane compound of the general formula

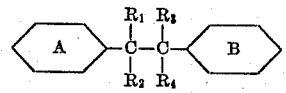

in which $R_1$ to $R_4$ are each selected from the group consisting of hydrogen and alkyl radicals containing up to 4 carbon atoms, at least two of $R_1$ to $R_4$ being alkyl radicals, and in which the benzene radicals A and B are selected from the group consisting of unsubstituted benzene radicals, methyl-substituted benzene radicals and methoxy-substituted benzene radicals.

The diphenyl-ethane compounds used in the process of the present invention are such as will not, at 0.01 percent concentration by weight, substantially accelerate the rate of polymerisation of pure styrene at 125° C. up to a conversion of 50 percent but will become effective in significantly accelerating the rate at some temperature lying within the range of 150 to 250° C. during the final 10 percent of the polymerisation.

As examples of catalysts suitable for use in the process of the invention there may be mentioned ($\alpha\alpha$:$\beta\beta$-tetramethyl)-diphenyl-ethane, ($\alpha$-methyl-$\alpha$ - ethyl:$\beta$ - methyl-$\beta$-ethyl)-diphenyl ethane, ($\alpha\alpha$:$\beta\beta$-tetraethyl) - diphenyl-ethane and ($\alpha\beta$-diisopropyl)-$\alpha\beta$-diphenyl-ethane. The comparative inactivity of these catalysts in accelerating the polymerisation rate of pure styrene at 125° C. has been demonstrated by measurements of the polymerisation rate of (a) samples of styrene containing the different diphenyl-ethane compounds in a concentration of 0.01 percent by weight, heated at 125° C.; and (b) styrene containing 0.01 percent by weight of dicumyl peroxide (for comparison) heated at 125° C., the measurements being expressed in relation to the rate of polymerisation of styrene alone at 125° C. The results are shown in the following table:

| Catalyst (0.01% by weight) | Polymerisation rate at 125° C. (expressed as a percent increase over the rate for for styrene alone) |
|---|---|
| (1) ($\alpha\alpha$:$\beta\beta$-tetramethyl)-diphenyl-ethane ($R_1$ to $R_4$=CH$_3$) | 0 |
| (2) ($\alpha$-methyl-$\alpha$-ethyl:$\beta$-methyl-$\beta$-ethyl)-diphenyl-ethane ($R_1$ and $R_3$=CH$_3$; $R_2$ and $R_4$=C$_2$H$_5$) | +6 |
| (3) ($\alpha\alpha$:$\beta\beta$-tetraethyl)-diphenyl-ethane ($R_1$ to $R_4$=C$_2$H$_5$) | 0 |
| (4) ($\alpha\beta$-diisopropyl)-$\alpha\beta$-diphenyl-ethane ($R_2$ and $R_4$=isopropyl; $R_1$ and $R_3$=H) | 0 |
| (5) Dicumyl peroxide | +23 |

It will be seen that with each of the four specified diphenyl-ethane compounds the rate of polymerisation of pure styrene is not substantially accelerated at 125° C. On the other hand each of these compounds is operative in the range 150 to 250° C. whereas dicumyl peroxide decomposes too quickly to be of use within this temperature range.

We have found that the catalysts of the present invention, especially the compounds mentioned above, are well suited to the mass polymerisation of the compounds of the above kind whenever conditions of reaction involve an appreciable period of time within the range 150 to 250° C. In their nature the catalysts may be incorporated in the monomer before the start of polymerisation or in the polymerisation mass at any other convenient stage before their essential operation is required within the temperatures mentioned. The products obtained by the process of the present invention have excellent general properties.

In commercial practice, many bulk polymerisations of the systems here considered start at about 60 to 100° C.

and finish around 200° C. Small amounts of well-known catalysts such as benzoyl peroxide or tertiary-butyl peroxide are sometimes added. Irrespective of their presence the polymerizations are comparatively easy to control in temperature whenever the mass is reasonably mobile. Beyond this condition temperatures are appropriate to the particular process and heat-transfer is always a significant factor, together with the heat of polymerisation. In the "can" or "mould" processes, problems of heat transfer need not be a dominating factor especially with small cans or suitably designed moulds, but significant self-heating is usually inevitable in the interior unless overall cycles are very long; in many instances it is arranged that the final mass reaches a temperature not far from 200° C. With a "tower" or a "continuous" process temperatures progressively increase throughout reaction so that satisfactory transport of material may be maintained. Excessive "runaway" of polymerization is usually avoided in the interests of control and the quality of product but final temperatures are frequently in the neighbourhood of 175 to 225° C. to ensure good flow of highly converted material.

The above mass polymerizations may be usefully accelerated in their late stages by the catalysts of the present invention and we find that the practical operation of these catalysts is quite different from that of the free radical catalysts commonly used hitherto, for example, benzoyl peroxide and tertiary-butyl peroxide. The latter accelerate the early and middle stages of polymerization and their adoption is limited by their instability and often by an adverse effect on the general properties of the product. They exhibit a tendency to dissipate their activity rapidly during any appreciable rise in temperature above their particular optimum, which rarely exceeds 150° C., and as such often tend to promote "runaway" and deleterious over-heating during the more sensitive stages of polymerization of the systems here considered, namely when the system possesses considerable heat-potential on account of a substantial content of monomer and also is very viscous. In almost complete contrast, we find that the catalysts of the present invention function very smoothly at their optimum temperatures within the range of about 150 to 250° C. and at these temperatures usefully accelerate the normally slow and insensitive stage when the content of monomer is comparatively low. The catalysts scarcely affect the earlier stages at lower temperatures and do not add to practical difficulties in control. On occasion it may be advantageous to employ both types of catalyst in complementary roles but such a combination is not an essential feature of the present invention. Indeed a particularly useful result is obtained with the present catalysts when they are employed in very small quantities with no catalyst of the other type deliberately added, and when they smoothly promote a substantial increase of output of product of high quality, using conventional continuous equipment such as a tower operating essentially as it would for uncatalyzed polymerization at lower output.

At the outset of our experimental work leading to the present invention it was doubtful whether a significant acceleration of the later stages of polymerization in the region of 200° C. could ever be achieved without seriously damaging the final material, particularly since the commonly used catalysts tend to lead to discolouration compared with the best product obtained by a purely thermal polymerization, and also in view of the observation that even a purely thermal polystyrene tends to discolour if a finishing temperature rear to 250° C. is maintained for any substantial time. We have discovered, however, that neither colour, clarity, molecular weight (judged by intrinsic viscosities) or general performance of a polystyrene need be significantly affected when small amounts of catalysts of the present invention are used, and prolonged heating within the range 150 to 250° C. is avoided. Prolonged heating becomes unnecessary on account of the acceleration of polymerization effected by the catalysts and excellent products may be obtained with quite low contents of monomer.

In a similar sense we have also found that the final products need not be degraded or unduly impaired even when rubber is incorporated in the monomer or at any other convenient stage in the polymerisation for the purpose of producing toughened or rubbery blends. The use of the aforementioned diphenyl-ethanes leads to useful acceleration of polymerization in these cases also, and the process of this invention therefore includes the use of systems where natural or synthetic rubber is employed in conjunction with compounds of the above kind. In general any question of colour is less significant in these cases, since the products do not possess brilliant clarity when rubber is present, but the invention has the particular merit that the catalysts can be incorporated easily in the blend at a relatively low temperature (up to about 125° C.) without substantially causing polymerisation.

In the above systems it is permissible to incorporate plasticizer, solvents or other common additives to modify the final properties of the products in respect of flow or other qualities, as generally understood and practiced.

Under certain conditions the products made according to the process of the present invention are significantly improved as compared with corresponding products obtained without the aid of the diphenyl-ethanes. Thus it is very difficult to prepare a polystyrene and a softening point higher than about 93° C. (B.S.S. 1493, 30° deflection) by heating pure styrene monomer alone and finishing off the polymerisation for a day or even longer at about 200° C. However, when (alpha-methyl-alpha-ethyl: beta-methyl-beta-ethyl)-diphenyl-ethane of the formula

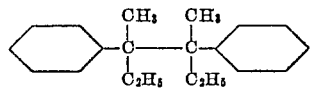

is initially present in pure styrene it is quite easily possible to obtain a final polystyrene with softening point of 95 to 96° C. This particular catalyst and preparations containing an appreciable proportion of the substance as an active ingredient are very suitable for the polymerization of styrene and its derivatives, with or without rubber present and the catalyst may be advantageously used in low concentration, even of the order of 0.001% by weight.

Although the invention has been described more especially with reference to the polymerisation of styrene and styrene derivatives, it is also applicable to the polymerisation of other monomers containing an ethylenic linkage as mentioned above, for example, mono-, di- and tri-allyl monomers, and also mixtures of polyvinyl chloride and allyl esters.

The following examples illustrate the invention:

*Example 1*

A solution of 0.05% of (α-methyl-α-ethyl:β-methyl-β-ethyl)-diphenyl-ethane in styrene was sealed in a tube under vacuum and submitted to heating for a period of 16 hours at 100° C. followed by 13 hours at temperatures rising from 150° C. to 220° C. The resulting polymer had a softening point of 95° and a monomer content of 0.1%.

A corresponding tube containing no catalyst and subjected to the same heat cycle resulted in polystyrene with a softening point of 89.5° C. and a monomer content of 1.2%.

*Example 2*

Styrene monomer containing 0.01% of (α-methyl-α-ethyl:β-methyl-β-ethyl)-diphenyl-ethane was polymerized at a temperature of 80° to 110° C. until 30% conversion was obtained. The mixture was then transferred to a continuous tower in which the temperature of the polymer mixture was raised from 150° C. to finally 220° C. The resultant polymer was extruded at the rate of 9 lbs per hour and had a monomer content of 0.5% and a softening point of 95° C.

A corresponding polymerization of styrene without catalyst gave a monomer content of 0.6% and a softening point 93° C. when extruded at a rate of 4½ lbs. per hour.

The general properties of the catalysed and uncatalysed polystyrenes were much the same.

*Example 3*

Styrene monomer containing 0.002% of (α-methyl-α-ethyl:β-methyl-β-ethyl)-diphenyl-ethane and 10% of a synthetic rubber (a butadiene/styrene copolymer rubber known under the tradename "Krylene.N.S.") was polymerized at a temperature of 80°–110° C. until 30% to 40% conversion was obtained. The mixture was then transferred to a continuous tower in which the temperature of the polymer mixture was raised from 150° C. to finally 220° C. The resultant toughened polymer was extruded at a rate of 5½ lbs. per hour, and had a monomer content of 0.5%.

A similar mix, containing no catalyst, when subjected to the same heat cycle and extruded at the same rate had a monomer content of 0.8%.

The physical properties of the two polymers were essentially the same.

*Example 4*

Three samples of vinyl toluene monomer (consisting predominantly of a mixture of the ortho- and para-isomers), viz. (A) containing no catalyst, (B) and (C) each containing 0.005% by weight of (α-methyl-α-ethyl:β-methyl - β - ethyl) - diphenyl - ethane, were subjected to polymerisation in vacuo in a sealed tube according to the following polymerisation cycles:

(A) 24 hours at 100° C.
3 hours at 170° C.
20 hours at 200° C.

(B) 24 hours at 100° C.
3 hours at 170° C.
10 hours at 200° C.

(C) 24 hours at 100° C.
3 hours at 170° C.
17 hours at 200° C.

The products were tested for monomer content and softening point, and gave results as follows:

| Sample | Monomer Content (percent by weight) | Softening point (B.S.S.) ° C. |
|---|---|---|
| (A) | 0.61 | 102.5 |
| (B) | 0.51 | 103 |
| (C) | 0.38 | 104.5 |

*Example 5*

100 parts of non-cross-linked butadiene/acrylonitrile copolymer rubber (known under the tradename "Krynac 800") were mixed with 90 parts of vinyl toluene monomer (a mixture consisting predominantly of ortho- and para-isomers) and 10 parts of divinyl-benzene on a mill at room temperatutre until a homogeneous blend was obtained. The blend was divided into two parts viz. (A) with no catalyst and (B) with 2 parts by weight of αα:ββ-tetraethyl-diphenyl ethane (=1%), the catalyst being readily incorporated in (B) by milling at up to 125° C. no substantial polymerisation occurring at this temperature. The two blends were forced into small cans and heated for 30 minutes at a temperature of 180° C. (in the material).

The final products had the following properties:

(A) The product was very pliable, smelled strongly of monomer and had little strength.

(B) The product did not smell of monomer, was resistant to tearing and was cross-linked. The product was similar in colour to the original rubber.

*Example 6*

Two samples of diallyl phthalate monomer containing (A) no catalyst and (B) 0.1 percent by weight of (α-methyl-α-ethyl:β-methyl-β - methyl) - diphenyl-ethane were each subjected to polymerisation in vacuo in a sealed tube for 16 hours at 200° C. At the end of this treatment sample (A) was substantially unchanged whereas (B) had fully polymerised to a clear, hard, cross-linked resin of good colour.

We claim:

1. A process for the polymerisation in mass of unsaturated compounds containing ethylenic linkages selected from the group consisting of styrene, ortho-, meta- and para-vinyl toluenes and diallyl phthalate monomers, which comprises the step of partially polymerising the said unsaturated compound in a first stage by heating to a temperature of at most 125° C. until the polymerisable compound has been converted to an extent of at least 30%, any polymerisation initiator used in this stage being one that dissociates to give free radicals, and thereafter further polymerising the compound by heating it in a final stage to a temperature within the range of 150 to 250° C. while catalytically accelerating the rate of polymerisation to a significant extent by the incorporation of at least 0.001% by weight of a diphenyl-ethane compound of the general formula

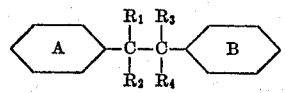

in which $R_1$ to $R_4$ are each selected from the group consisting of hydrogen and alkyl radicals containing up to 4 carbon atoms, at least two or $R_1$ to $R_4$ being alkyl radicals, and in which the benzene radicals A and B are selected from the group consisting of unsubstituted benzene radicals, methyl-substituted benzene radicals and methoxy-substituted benzene radicals.

2. A process as claimed in claim 1, wherein the diphenyl-ethane compound is (α-methyl-α-ethyl:β-methyl-β-ethyl)-diphenyl-ethane.

3. A process as claimed in claim 1, wherein the diphenyl-ethane compound is selected from the group consisting of (αα:ββ-tetramethyl)-diphenyl-ethane, (αα:ββ-tetraethyl)-diphenyl-ethane and (αβ-diisopropyl)-αβ-diphenyl-ethane.

4. A process for the polymerisation in mass of a vinyl-benzene monomer, said vinyl monomer having incorporated therewith a synthetic rubber selected from the group consisting of butadiene-styrene copolymers and butadiene-acrylonitrile copolymers, which comprises the step of partially polymerising the said vinyl monomer in a first stage by heating the reaction mixture to a temperature of at most 125° C. until the polymerisable monomer has been converted to an extent of at least 30%, any polymerisation initiator used in this stage being one that dissociates to give free radicals, and thereafter further polymerising the compound by heating it in a final stage to a temperature within the range of 150 to 250° C. while catalytically accelerating the rate of polymerisation to a significant extent by the incorporation of at least 0.001% by weight of a diphenyl-ethane compound of the general formula

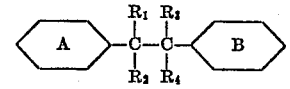

in which $R_1$ to $R_4$ are each selected from the group consisting of hydrogen and alkyl radicals containing up to 4 carbon atoms, at least two of $R_1$ to $R_4$ being alkyl radicals, and in which the benzene radicals A and B are each selected from the group consisting of unsubstituted benzene radicals, methyl-substituted benzene radicals and methoxy-substituted benzene radicals.

5. A process for the polymerisation in mass of styrene, which comprises the step of partially polymerising styrene monomer in a first stage by heating to a temperature of at most 125° C. until it has been converted to an extent of at least 30%, any polymerisation initiator used in this stage being one that dissociates to give free radicals, and thereafter heating the partly polymerised styrene in a final stage to a temperature within the range of 150 to 250° C. while catalytically accelerating the rate of polymerisation to a significant extent by the incorporation of at least 0.001 percent by weight of ($\alpha$-methyl-$\alpha$-ethyl:$\beta$-methyl-$\beta$-ethyl)-diphenyl-ethane.

6. A process as claimed in claim 5, wherein the polymerisation is carried out in a tower process.

7. A process as claimed in claim 5, wherein the diphenyl-ethane compound is used in a proportion within the range of 0.001 to 0.05 percent by weight.

8. A process for the polymerisation in mass of diallyl phthalate, which comprises the step of partially polymerising diallyl phthalate monomer in a first stage by raising its temperature to at most 125° C. until the said monomer has been converted to an extent of at least 30% in the presence of a free-radical polymerisation initiator effective at temperatures up to 125° C. in accelerating the polymerisation, and thereafter raising the temperature of the partially polymerized ester in a final stage to a temperature within the range of 150 to 250° C. while catalytically accelerating the rate of polymerisation to a significant extent by the incorporation of at least 0.001% by weight of a diphenyl-ethane compound of the general formula

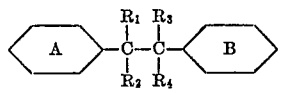

in which $R_1$ to $R_4$ are each selected from the group consisting of hydrogen and alkyl radicals containing up to 4 carbon atoms, at least two of $R_1$ to $R_4$ being alkyl radicals, and in which the benzene radicals A and B are selected from the group consisting of unsubstituted benzene radicals, methyl-substituted benzene radicals and methoxy-substituted benzene radicals.

9. A process for the polymerisation in mass of styrene, which comprises the step of partially polymerising in a tower process styrene monomer in a first stage by heating to a temperature of at most 125° C. until it has been converted to an extent of at least 30%, any polymerisation initiator used in this stage being one that dissociates to give free radicals, and thereafter heating the partly polymerised styrene in a final stage to a temperature within the range of 150 to 250° C. while catalytically accelerating the rate of polymerisation to a significant extent by the incorporation of a diphenyl-ethane compound selected from the group consisting of ($\alpha$-methyl-$\alpha$-ethyl:$\beta$-methyl-$\beta$-ethyl)-diphenyl-ethane, ($\alpha\alpha$:$\beta\beta$-tetramethyl)-diphenyl-ethane, ($\alpha\alpha$:$\beta\beta$-tetraethyl)-diphenyl-ethane and ($\alpha\beta$-diisopropyl)-$\alpha\beta$-diphenyl-ethane in a proportion within the range 0.001 to 0.05 percent calculated on the weight of the styrene.

10. A process as claimed in claim 9, wherein the styrene contains dissolved therein a synthetic rubber selected from the group of butadiene-styrene copolymers and butadiene-acrylonitrile copolymers.

References Cited in the file of this patent
UNITED STATES PATENTS
2,902,464     Chapin et al. _____ Sept. 1, 1959